US008972546B2

United States Patent
Islam et al.

(10) Patent No.: US 8,972,546 B2
(45) Date of Patent: Mar. 3, 2015

(54) APPARATUS SYSTEM AND METHOD FOR BOOTING A SERVER FROM A STORAGE SYSTEM

(75) Inventors: Shah Mohammad Rezaul Islam, Tucson, AZ (US); Gregg Steven Lucas, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 1987 days.

(21) Appl. No.: 11/464,460

(22) Filed: Aug. 14, 2006

(65) Prior Publication Data

US 2008/0040462 A1 Feb. 14, 2008

(51) Int. Cl.
*G06F 15/177* (2006.01)
*G06F 9/44* (2006.01)
*G06F 11/14* (2006.01)
*G06F 11/07* (2006.01)
*G06F 21/57* (2013.01)

(52) U.S. Cl.
CPC .......... *G06F 9/4405* (2013.01); *G06F 11/1417* (2013.01); *G06F 9/4406* (2013.01); *G06F 9/4416* (2013.01); *G06F 11/0727* (2013.01); *G06F 21/575* (2013.01); *G06F 11/1435* (2013.01)
USPC ........... 709/222; 709/201; 709/215; 709/220; 709/221; 713/1; 713/100

(58) Field of Classification Search
CPC ..... G06F 15/177; G06F 21/575; G06F 9/445; G06F 21/57; G06F 9/441; G06F 9/4401–9/4418; G06F 11/1415–11/1435; H04L 67/34
USPC ................... 709/220–223; 713/2, 1
See application file for complete search history.

(56) References Cited

U.S. PATENT DOCUMENTS

| | | | | |
|---|---|---|---|---|
| 7,197,606 | B2 * | 3/2007 | Kobayashi et al. | 711/147 |
| 7,533,190 | B2 * | 5/2009 | Lerner et al. | 709/250 |
| 2003/0188176 | A1 | 10/2003 | Abbondanzio et al. | 713/191 |
| 2003/0226004 | A1 | 12/2003 | Abbondanzio et al. | 713/1 |
| 2004/0003082 | A1 * | 1/2004 | Abbondanzio et al. | 709/225 |
| 2004/0153639 | A1 * | 8/2004 | Cherian et al. | 713/2 |
| 2005/0028000 | A1 | 2/2005 | Bulusu et al. | 713/200 |
| 2005/0097360 | A1 | 5/2005 | Chu et al. | 713/201 |
| 2006/0020848 | A1 * | 1/2006 | Maity et al. | 714/6 |
| 2006/0047852 | A1 * | 3/2006 | Shah et al. | 709/245 |
| 2006/0075217 | A1 * | 4/2006 | Takamoto et al. | 713/2 |
| 2006/0136703 | A1 * | 6/2006 | Wisecup et al. | 713/2 |
| 2009/0222896 | A1 * | 9/2009 | Ichikawa et al. | 726/6 |

* cited by examiner

*Primary Examiner* — Asad Nawaz
*Assistant Examiner* — Najeebuddin Ansari
(74) *Attorney, Agent, or Firm* — Kunzler Law Group

(57) ABSTRACT

An apparatus, system, and computer readable medium are disclosed for booting a server from a shared storage system. The present invention teaches at least one server having at least one processor, a storage system having a plurality of storage drives and at least one boot volume corresponding to the at least one server, and a switch fabric having at least one switch; the switch fabric isolates boot traffic form storage traffic and enables communication between the server and the boot volume of the storage system. In some embodiments the switch fabric includes one or more partitionable switches that isolate boot traffic from storage traffic. The boot volumes may be a redundant array of storage devices. In certain embodiments, the present invention also includes devices external to the server, switch fabric, and storage system.

21 Claims, 5 Drawing Sheets

APPARATUS SYSTEM AND METHOD FOR BOOTING A SERVER FROM A STORAGE SYSTEM

BACKGROUND OF THE INVENTION

1. Field of the Invention

This invention relates to systems, methods, and apparatus for booting servers and more particularly relates to systems, methods, and apparatus for booting servers from a shared storage system.

2. Description of the Related Art

Developing and improving servers continues to be a vital aspect of data communication systems. Two important aspects of server development and improvement include decreasing the physical size of servers and increasing server performance. One specific function relevant to server performance is server booting.

Currently available server boot approaches include storing boot data locally on a server. For example, FIG. 1 is a schematic block diagram of a typical server boot system 100. The depicted system 100 includes one or more servers 110 with a boot drive 112, a switch fabric 120, and a storage system 130 with a raid controller 132, and a data storage drive 134. Booting the servers 110 includes accessing locally stored boot data 112. After the servers 110 are booted, the servers 110 may then communicate with the storage system 130 via the switch fabric 120 to perform post boot operations.

The boot drives 112 increase the necessary size of each server 110 as storing the boot drives 112 locally require additional server 110 space. Increasing the necessary size of the servers 110 is especially problematic in systems with a large number of servers 110 or server blades. As the number of servers 110 in a system increases, so does the benefit of figuring out how to reduce the physical size of each server.

From the foregoing discussion, it should be apparent that a need exists for a system, apparatus, and method for reducing the necessary server size. Beneficially, such a system, apparatus and method would substantially decrease the size of each server and improve the overall computing enterprise.

SUMMARY OF THE INVENTION

The present invention has been developed in response to the present state of the art, and in particular, in response to the problems and needs in the art that have not yet been fully solved by currently available booting solutions. Accordingly, the present invention has been developed to provide an apparatus, system, and method for booting a server from a shared boot data storage.

In one aspect of the present system, server size is decreased by relocating the server boot drives of one or more servers to a shared storage system. The system in the described embodiments includes one or more servers each having a processor, a storage system having multiple storage volumes and one or more boot volumes corresponding to the servers, and a switch fabric having one ore more partitionable switches; the switch fabric isolates boot traffic from non-boot traffic and enables communication between the servers and the storage system.

In certain embodiments, the system includes external devices with which the servers and storage system may communicate. In some embodiments, the external devices may include additional storage devices. In some embodiments, the switch fabric includes one or more partitionable switches that isolate boot traffic from storage traffic. In some embodiments, the storage volumes and boot volumes are housed in one or more drive enclosure blades. In certain embodiments, the servers may be server blades within the same chassis. In some embodiments, the system for booting a server may also include one or more storage controllers or storage controller blades.

An apparatus of the present invention is also presented for booting a server from a shared storage system. The apparatus may be embodied as a communication module connected to a switch fabric; the communication module receives a boot data request from a server via the switch fabric, a boot storage module that stores boot data, and a data access module that accesses boot data according to the boot data request. The communication module also communicates the requested boot data to the server. In certain embodiments, the communication module is an internal switch module. In some embodiments, the apparatus may also include one or more storage controllers or storage controller blades.

A method of the present invention is also presented for booting a server from a shared storage system. The method in the disclosed embodiments substantially includes the operations necessary to carry out the functions presented above with respect to the operation of the described apparatus and system. In one embodiment, the method includes connecting to a switch fabric, receiving a boot data request from a server via the switch fabric, accessing boot data corresponding to the boot data request, and communicating the boot data to the server via the switch fabric.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
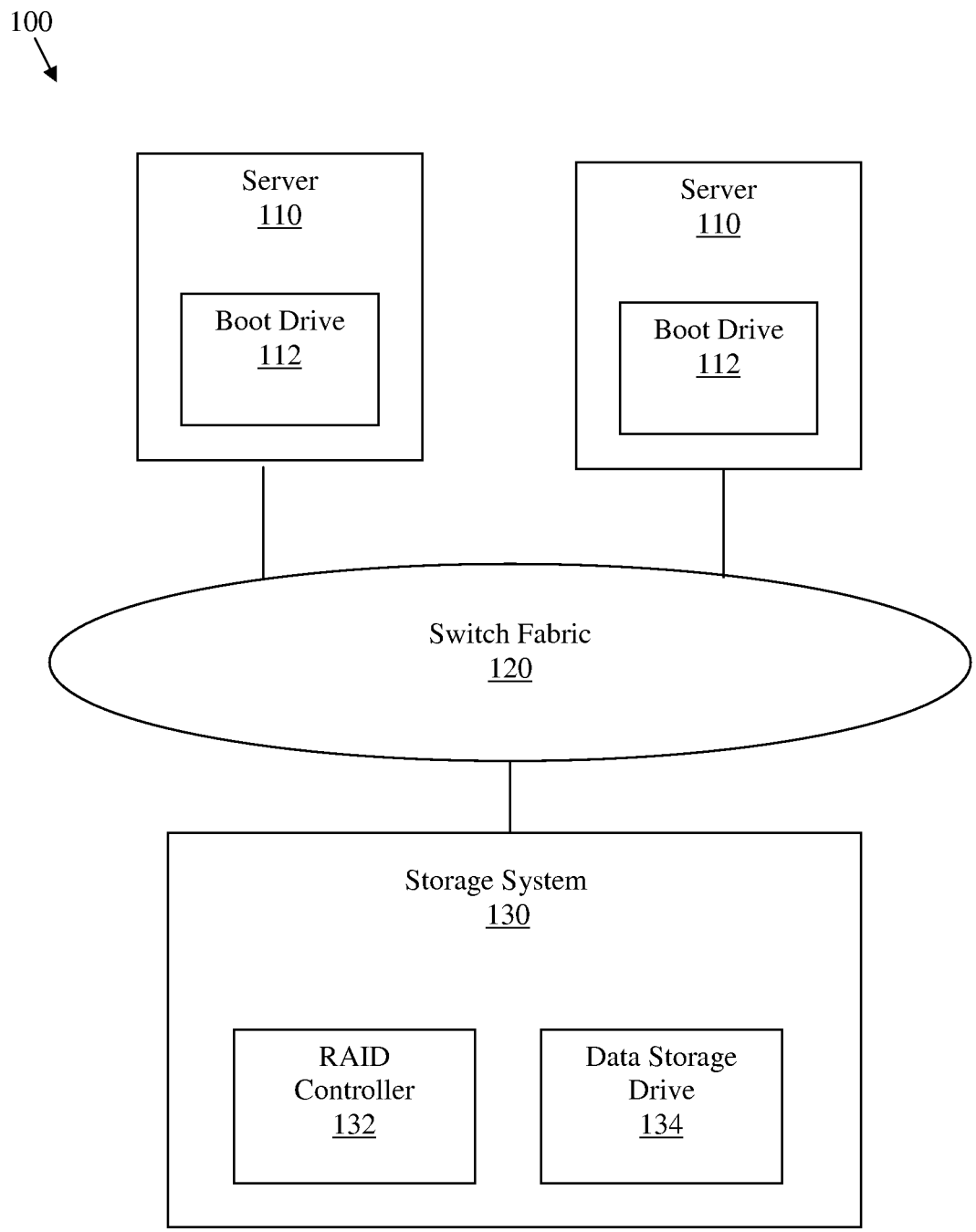
FIG. 1 is a schematic block diagram of a typical server boot system in accordance with previous inventions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of generating a signal, causing a signal to be generated, or causing execution of a program of machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
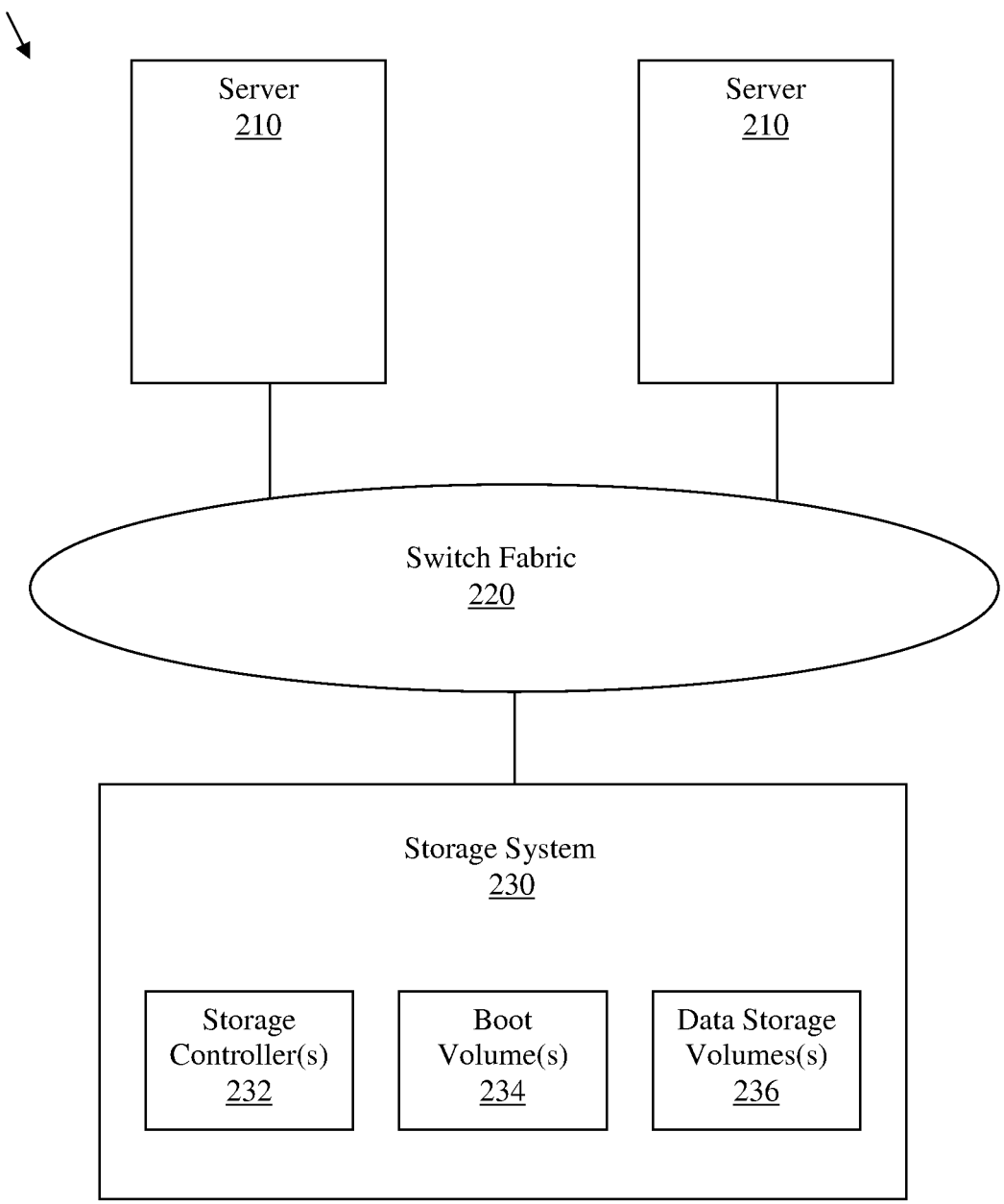
FIG. 2 is a schematic block diagram of one embodiment of a server boot system in accordance with the present invention.

FIG. 2 is a schematic block diagram of a server boot system 200 in accordance with the present invention. The depicted system 200 includes one or more servers 210, a switch fabric 220, a storage system 230, one or more storage controllers 232, one or more boot volumes 234, and one or more data storage volumes 236. The server boot system 200 decreases the required physical size of the servers 210 by relocating the server boot drives to the storage system 230.

The servers 210 boot from the boot volumes 234 in the storage system 230. In certain embodiments, the servers 210 are server blades within the same or different chassis (see FIG. 5). In such embodiments, the servers 210 may be in the same chassis as the storage system 230. The depicted system 200 includes two servers 210; however, any number of servers would be consistent with the present invention. As the number of servers 210 within the system 200 increases, so does the benefit of decreasing the necessary size of each server 210.

The switch fabric 220 enables a communication pathway between the servers 210 and the storage system 230. In certain embodiments, the switch fabric 220 also enables communication with external devices (see FIG. 5). In certain embodiments, each server 210 is assigned a separate communication pathway such that one server cannot see or access the communication pathway assigned to another server. In certain embodiments, the switch fabric 220 may be partitioned to isolate boot traffic from other traffic such as storage traffic and external device traffic. Isolating boot traffic from other traffic facilitates booting the servers 210 as though the boot volumes 234 were local to the servers 210.

The boot volumes 234 may reside on the same storage devices as the data storage volumes 236 or on separate storage devices. The boot volumes 234 may include boot data for the servers 210. In certain embodiments, the boot volumes 234 include a redundant array of boot storage devices. In certain embodiments, the boot volumes 234 include one or more drive enclosure blades. In such embodiments, the boot drives may be stored within the same or different drive enclosure blades than the data storage volumes 236. The boot volumes 234 may be partitioned or organized in accordance with the number of servers 210. For example, the boot volumes 234 may be partitioned such that one server may not see or access the boot volume that corresponds to another server. Partitioning and organizing shared boot volumes 234 facilitates efficient and effective boot data management, updating, and troubleshooting.

The depicted storage system 230 may include a chassis for housing the storage controller 232, the boot volumes 234, and the data storage volumes 236. The storage controller 232 facilitates communication of non-boot traffic between the servers 210 and the data storage volumes 236. In certain embodiments, the storage controller 232 may include one or more controller blades 232. The data storage volumes 236 include any form of data bearing medium accessible to the servers 210. The data storage volumes 236 store non-boot data. In certain embodiments, the data storage volumes 236 include one or more drive enclosure blades.

Figure 3:
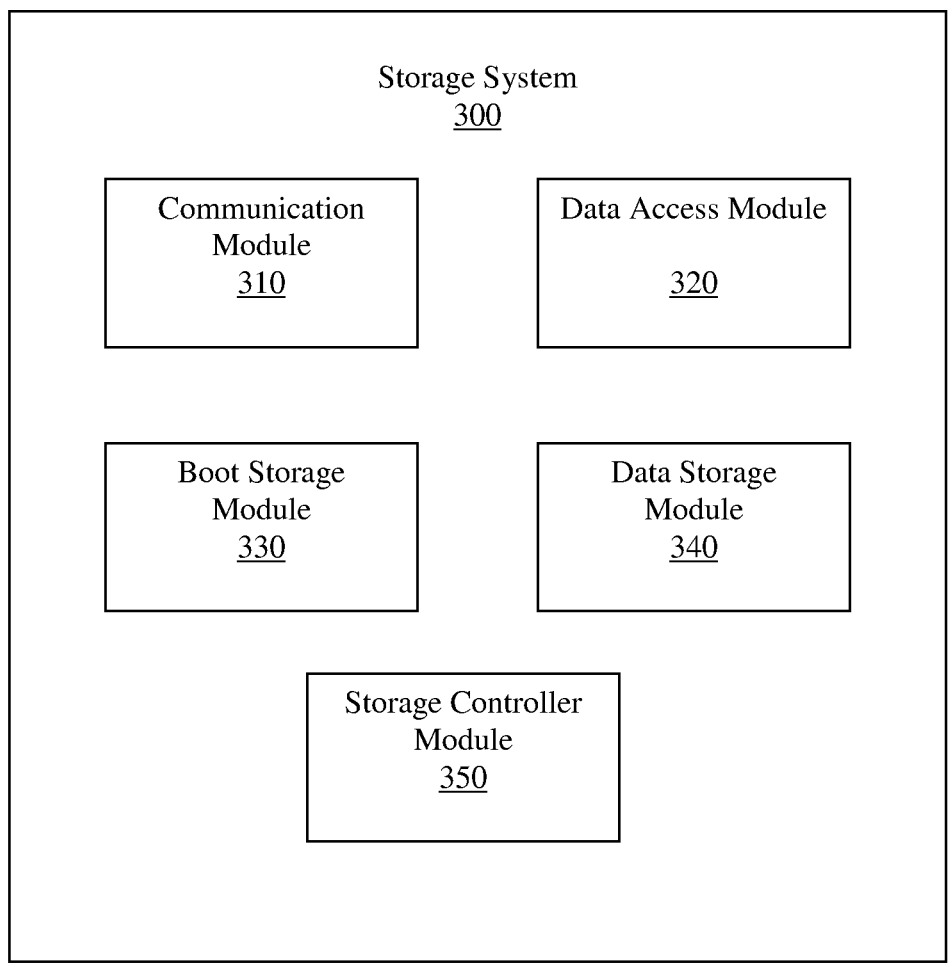
FIG. 3 is a schematic block diagram of one embodiment of a storage system in accordance with the present invention.

FIG. 3 is a schematic block diagram of a storage system 300 in accordance with the present invention. The depicted storage system 300 includes a communication module 310, a data access module 320, a boot storage module 330, a data storage module 340, and a storage controller module 350. The various components of the storage system 300 reduce the necessary server size by providing an alternate location for the server boot drives while enabling the server to boot from boot volumes as though the boot volumes were local to the server.

The communication module 310 receives a boot data request from a server 210 via a switch fabric 220. The communication module 310 also communicates the requested boot data to the requesting server 210. In certain embodiments, the communication module is also configured to communicate with external devices via the switch fabric 220. In certain embodiments, the communication module 310 is an internal switch module (see FIG. 5). In embodiments with multiple servers 210, the communication module 310 may receive a boot data request from each of the servers 210 and in turn communicate the appropriate boot data to the appropriate server 210.

The boot storage module 330 stores server boot data and may correspond to the boot volumes 234 of FIG. 2. In certain embodiments, the boot storage module 330 includes boot data for multiple servers 210 in a redundant array of boot drives. For example, in some embodiments, the boot data is partitioned and assigned to a specific server 210. In other embodiments, the same boot data may be accessible to a group of servers 210. The particular organization of the boot data will depend upon the needs of the particular embodiment.

In certain embodiments, the data access module 320 differentiates between a request to access the boot storage module 330 and a request to access the data storage module 340. The data storage module 340 may include non-boot data and correspond to the data storage volumes 236 of FIG. 2. In certain embodiments, non-boot data may include data necessary for the server to perform post boot operations. The storage controller module 350 facilitates communication between the server 210 and the data storage module 340, and may correspond to the storage controller 232 of FIG. 2. In certain embodiments, the storage controller module 350 is one or more RAID controllers or RAID controller blades.

Figure 4:
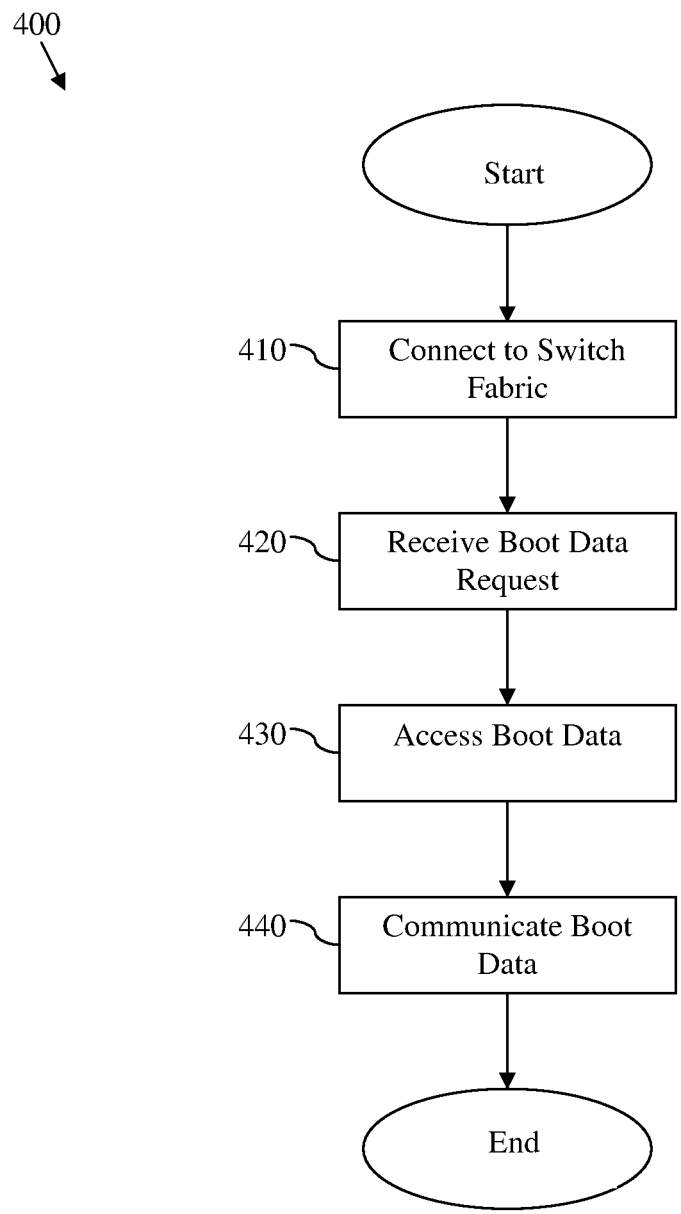
FIG. 4 is a schematic flow diagram of one embodiment of server boot method in accordance with the present invention.

FIG. 4 is a schematic flow diagram of one embodiment of server boot method 400 in accordance with the present invention. The depicted method 400 includes the operations of connecting 410 to a switch fabric, receiving 420 a boot data request from a server, accessing 430 boot data corresponding to the boot data request, and communicating 440 the boot data to the server via the switch fabric. The operations of the method 400 decrease server size by enabling the servers to boot from a shared boot storage.

Connecting 410 to a switch fabric may include a communication module 310 connecting to a switch fabric 220 also connected to a server 210. Once connected, the communication module 310 may receive 420 a boot data request from the server 210. In certain embodiments, the communication module 310 may also receive a request to access a data storage module 340.

After receiving 420 the boot data request, the communication module 310 may forward the request to a data access module 320. Accessing 430 boot data may include a data access module 320 accessing boot data stored in a boot storage module 330 in accordance with the boot data request. In certain embodiments, accessing 430 boot data may include accessing boot data that has been specifically assigned to the requesting server 210.

Once the appropriate data is accessed, a communication module 310 may communicate 440 the boot data to the appropriate server 210 via a switch fabric 220. In certain embodiments, the communication module 310 may communicate 440 the boot data to the server 210 via a partitioned zone within the switch fabric 220 configured to isolate boot traffic from storage traffic. In embodiments, the partitioned zone is the same partitioned zone used to receive 420 the boot data request.

Figure 5:
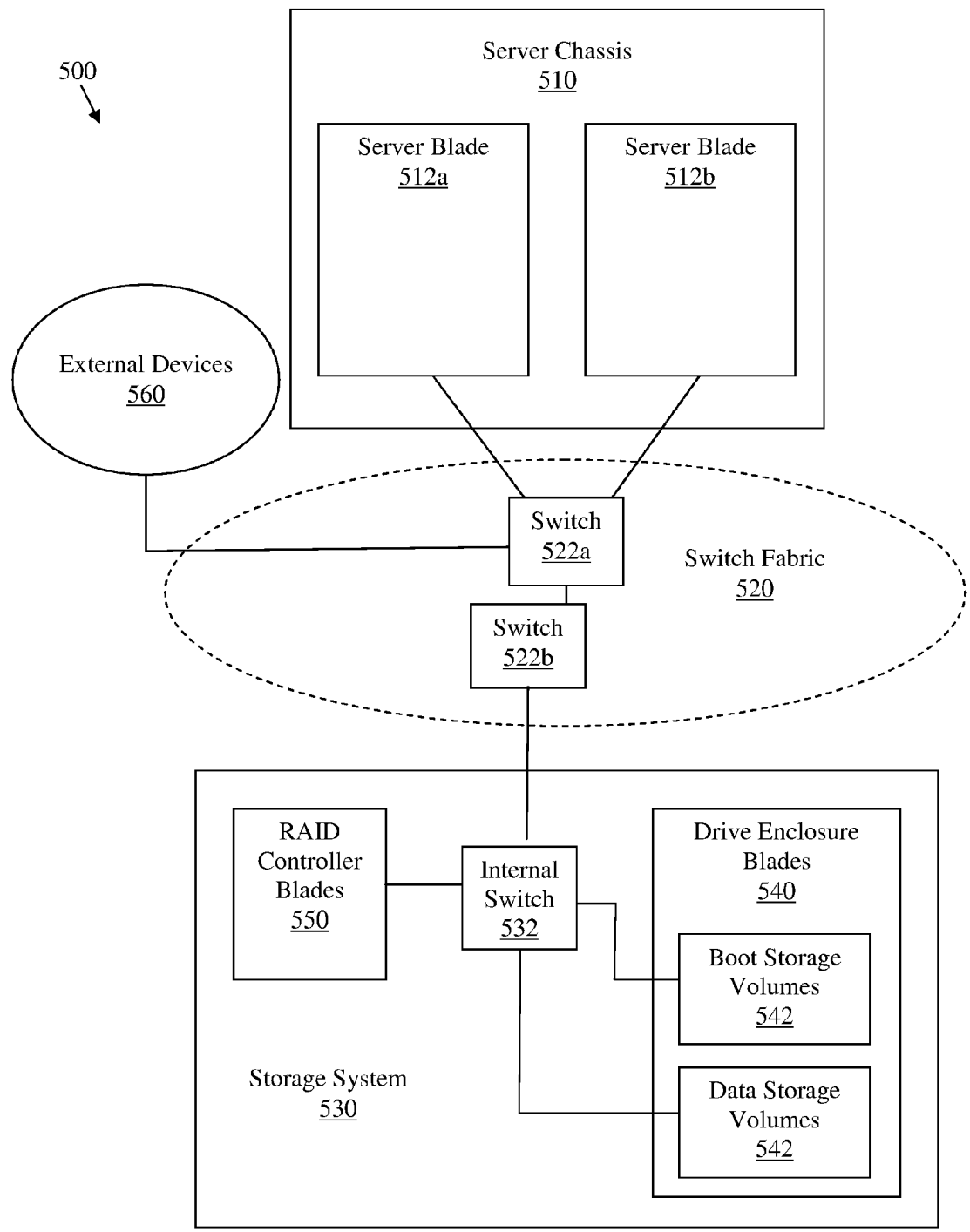
FIG. 5 is a schematic block diagram of one embodiment a server boot system in accordance with the present invention.

FIG. 5 is a schematic block diagram of a particular embodiment of a server boot system 500 in accordance with the present invention. The depicted system 500 includes a server chassis 510, one or more server blades 512, a switch fabric 520, a boot/storage traffic switch 522, a storage system 530, an internal switch 532, drive enclosure blades 540, boot storage volumes 542, data storage volumes 544, RAID controller blades 550, and external devices 560. The various components of the depicted system 500 illustrate a specific embodiment of the present invention.

The server chassis 510 houses the server blades 512. In some embodiments, the server chassis 510 includes more server blades than the server blades 512 depicted in FIG. 5. The server blades 512 may communicate a boot data request to the boot/storage traffic switch 522. The boot/storage traffic switch 522 may forward the boot data request to the internal switch 532 within the storage system 530.

Because the boot data request is boot traffic, as opposed to controller traffic or data storage traffic, the internal switch 532 may forward the boot data request to the boot storage volumes 542. The boot storage volumes 542 may include the boot data corresponding to the boot data request. In the depicted embodiment, the boot storage volumes 542 and data storage volumes 544 are housed within drive enclosure blades 540. The boot data corresponding to the boot data request may be accessed and forwarded to the internal switch 532.

The internal switch 532 may then forward the boot data through the switch fabric 520 and back to the appropriate server blade 512. Once the server blades 512 are booted, the server blades 512 may carry on other operations such as communicating with the RAID controller blades 550 and accessing the data storage volumes 544, via the boot/storage traffic switch 522. The servers 512 may access data on the external devices 560 via the boot/storage traffic switch 522.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for booting a server from a storage system, the system comprising:
    a plurality of servers each comprising at least one processor;
    a storage system communicating with the plurality of servers through a switch fabric and comprising a plurality of boot volumes each corresponding to one of the plurality of servers and each server booting from a corresponding boot volume that comprises all boot files required by the server for booting an operating system configured for the server and each other server of the plurality of servers cannot access and see the boot volume and each of the boot volumes is accessible by one server of the plurality of servers;
    the switch fabric comprising at least one partitionable switch, the switch fabric partitioning a separate communication pathway between each server and a corresponding boot volume, the separate communication pathway isolating boot traffic from non-boot traffic and preventing the transmission of the non-boot traffic from a data storage volume to the corresponding server, the switch fabric being switchable between allowing transmission of the boot traffic from the boot volume to the corresponding server on the separate communication pathway and preventing the transmission of the non-boot traffic from a data storage volume to the corresponding server and between allowing transmission of the non-boot traffic from the data storage volume to the corresponding server and preventing the transmission of the boot traffic from the boot volume to the corresponding server.

2. The system of claim 1, further comprising external devices.

3. The system of claim 1, wherein each boot volume resides in a redundant array of storage devices.

4. The system of claim 1, wherein a plurality of storage volumes and each boot volume reside within at least one drive enclosure blade.

5. The system of claim 1, wherein the at least one server comprises a server blade.

6. The system of claim 1, wherein the storage system further comprises at least one storage controller.

7. The system of claim 6, wherein the at least one storage controller is housed within at least one storage controller blade.

8. An apparatus for booting a server from a storage system, the apparatus comprising:
   a single boot volume storing all boot data required by the server for booting an operating system on the server, the single boot volume being accessible only to the server and the server booting from the single boot volume that comprises all boot files required by the server for booting an operating system configured for the server and wherein other servers of a plurality of servers cannot access and see the boot volume and each of the boot volumes of the plurality of servers is accessible by one server of the plurality of servers;
   a non-transitory computer readable storage medium storing code executable by a processor, the code comprising:
   a communication module connected to a switch fabric comprising at least one partitionable switch, the switch fabric partitioning a separate communication pathway between the server and a single boot volume, the separate communication pathway isolating boot traffic from non-boot traffic and preventing the transmission of the non-boot traffic to the server when the server is booting, the switch fabric being switchable between allowing transmission of the boot traffic from the single boot volume to the server on the separate communication pathway and preventing the transmission of the non-boot traffic from a data storage volume to the server and between allowing transmission of the non-boot traffic from the data storage volume to the server and preventing the transmission of the boot traffic from the single boot volume to the server;
   the communication module further presenting boot data to the server;
   a data access module accessing the boot data stored on the single boot volume in accordance with the boot data request; and
   the communication module further communicating the boot data stored on the single boot volume to the server over the separate communication pathway in response to receiving the boot data request.

9. The apparatus of claim 8, wherein the single boot volume comprises one of a plurality of boot storage devices of a redundant array of boot storage devices.

10. The apparatus of claim 8, the communication module further communicating with external devices via the switch fabric.

11. The apparatus of claim 8, wherein the communication module receives the boot data request via a partitioned zone within the switch fabric that isolates the boot traffic from the non-boot traffic.

12. The apparatus of claim 8, wherein the data storage volume stores non-boot data and the single boot volume reside within at least one enclosure blade.

13. The apparatus of claim 8, wherein the communication module comprises an internal switch module.

14. The apparatus of claim 8, further comprising at least one storage controller.

15. The apparatus of claim 14, wherein the at least one storage controller is housed within at least one storage controller blade.

16. A method for booting a server from a storage system, the method comprising:
   connecting, by use of a processor, a single boot volume to a switch fabric comprising at least one partitionable switch, partitioning a separate communication pathway between the server and the single boot volume that comprises all boot files required by the server for booting an operating system configured for the server, the single boot volume specifically assigned to the server wherein other servers of a plurality of servers cannot access and see the boot volume and each of the boot volumes of the plurality of servers is accessible by one server of the plurality of servers, the separate communication pathway isolating boot traffic from non-boot traffic and preventing the transmission of the non-boot traffic from a data storage volume to the server, the switch fabric being switchable between allowing transmission of the boot traffic from the single boot volume to the server on the separate communication pathway and preventing the transmission of the non-boot traffic from a data storage volume to the server and between allowing transmission of the non-boot traffic from the data storage volume to the server and preventing the transmission of the boot traffic from the single boot volume to the server;
   receiving a boot data request from the server attached to the switch fabric via the switch fabric;
   accessing all boot data corresponding to the boot data request from the single boot volume;
   booting the server using the boot data;
   while booting the server, operating the switch fabric to allow the transmission of boot data from the single boot volume to the server on an isolated traffic path and to prevent the transmission of non-boot data to the server; and
   after booting the server, operating the switch fabric to allow the transmission of non-boot data to the server.

17. The method of claim 16, wherein receiving a boot data request from the server attached to the switch fabric comprises receiving the boot data request via a partitioned zone within the switch fabric that isolates boot traffic from non-boot traffic.

18. The method of claim 16, wherein communicating the boot data to the server via the switch fabric comprises communicating the boot data to the server via a partitioned zone within the switch fabric that isolates boot traffic from storage traffic.

19. The method of claim 16, wherein accessing boot data corresponding to the boot data request comprises accessing boot data from one of an array of boot volumes.

20. The method of claim 16, wherein connecting to the switch fabric comprises connecting to the switch fabric, the switch fabric also connected to external devices.

21. A system for booting a server from a storage system, the system comprising:

a server chassis comprising a plurality of servers each comprising at least one processor;

a storage system communicating with the plurality of servers through a switch fabric and comprising at least one storage controller, a plurality of data storage volumes each corresponding to one of the plurality of servers, and a plurality of boot volumes each corresponding to one of the plurality of servers and each server booting from a corresponding boot volume that comprises all boot files required by the server for booting an operating system configured for the server and wherein other servers of a plurality of servers cannot access and see the boot volume and each of the boot volumes of the plurality of servers is accessible by one server of the plurality of servers;

the switch fabric comprising at least one partitionable switch, the switch fabric partitioning a separate communication pathway between each server and a corresponding boot volume, the separate communication pathway isolating boot traffic from non-boot traffic and preventing the transmission of the non-boot traffic from a data storage volume to the corresponding server, the switch fabric being switchable between allowing transmission of the boot traffic from the boot volume to the corresponding server on the separate communication pathway and preventing the transmission of the non-boot traffic from a data storage volume to the corresponding server and between allowing transmission of the non-boot traffic from the data storage volume to the corresponding server and preventing the transmission of the boot traffic from the boot volume to the corresponding server.

* * * * *